United States Patent [19]

Dieterich

[11] Patent Number: 5,335,020
[45] Date of Patent: Aug. 2, 1994

[54] IIR GHOST CANCELLING SYSTEM WITH REDUCTION OF FILTER INSTABILITY

[75] Inventor: Charles B. Dieterich, Kingston, N.J.

[73] Assignee: RCA Thomson Licensing Corporation, Princeton, N.J.

[21] Appl. No.: 25,496

[22] Filed: Mar. 3, 1993

[51] Int. Cl.$^5$ .................... H04N 5/213; H04N 5/21
[52] U.S. Cl. .................... 348/614; 348/476
[58] Field of Search .................... 358/167, 166, 905; 348/614; H04N 5/213, 5/21

[56] References Cited

U.S. PATENT DOCUMENTS

| | | | |
|---|---|---|---|
| 4,127,874 | 11/1978 | Iwasawa | 358/167 |
| 4,344,089 | 8/1982 | Utsunomiya | 358/167 |
| 4,583,120 | 4/1986 | Murakami | 358/167 |
| 4,864,403 | 9/1989 | Chao et al. | 358/167 |
| 5,065,241 | 11/1991 | Iga | 358/167 |

FOREIGN PATENT DOCUMENTS

| | | | |
|---|---|---|---|
| 5441 | 1/1982 | Japan | 358/167 |
| 57-45778 | 3/1982 | Japan | 358/905 |
| 101576 | 6/1983 | Japan | 358/167 |
| 214386 | 12/1984 | Japan | 358/167 |
| 74971 | 3/1991 | Japan | H04N 5/21 |
| 123276 | 5/1991 | Japan | H04N 5/21 |
| 145281 | 6/1991 | Japan | H04N 5/21 |

OTHER PUBLICATIONS

P. M. Ebert et al, "Overflow Oscillations in Digital Filters" Bell System Technical Journal, vol. 48, Nov. 1969 pp. 2999–3020.

Leland B Jackson "An Alysis of Limit Cycles Due to Multiplication Rounding in Recursive Digital Filters", Digital Signal Processing, edited by Rabiner and Rader, IEEE Press New York, 1972, pp. 439–447.

Primary Examiner—James J. Groody
Assistant Examiner—Chris Grant
Attorney, Agent, or Firm—Joseph S. Tripoli; Eric P. Herrmann; Ronald H. Kurdyla

[57] ABSTRACT

A ghost cancelling system includes a ghost cancelling IIR filter and channel modelling circuitry for generating tap weighting coefficients for programming the ghost cancelling IIR filter. The channel modelling circuitry includes means for calculating the sum of all of the generated weighting coefficient values. If the sum exceeds a predetermined value indicative of the IIR filter becoming unstable, the weighting coefficients are conditionally scaled in a manner to reduce the sum, thus tending to reduce the possibility of filter instability.

9 Claims, 2 Drawing Sheets

IIR GHOST CANCELLING SYSTEM WITH REDUCTION OF FILTER INSTABILITY

This invention relates to ghost cancelling systems which employ infinite impulse response (IIR) filters, and more particularly to apparatus for providing stable operation of the IIR filters in such system.

BACKGROUND OF THE INVENTION

Ghost cancelling systems nominally consist of two parts, a programmable filter and circuitry for calculating a model of the signal transmission channel. The channel modelling circuitry is responsive to a transmitted reference signal and a stored idealized reference signal for determining the characteristics of the transmission channel (in particular characteristics which may give rise to multipath distortion). From such characteristics, the channel modelling circuitry generates coefficients for programming the programmable filter to pass video signal with multipath distortion substantially eliminated. For a more detailed description of channel modelling techniques see U.S. Pat. No. 4,864,403, issued Sep. 5, 1989 and titled "Adaptive Television Ghost Cancellation System Including Filter Circuitry with Non-Integer Sample Delay" or *GHOST REDUCTION BY REPRODUCTION* by N. Komlya, IEEE Transactions on Consumer Electronics, August 1992, Vol. 38, No. 3, pp. 195–199, for example. The programmable filters are typically of two types, finite impulse response (FIR) and infinite impulse response (IIR). Some ghost cancelling systems employ FIR filters, others employ IRR filters, but the majority of systems use a combination of both.

Both the IIR and FIR ghost cancelling filters employ tapped delay lines providing a plurality of relatively delayed signals. The delayed signals are weighted by programmable coefficients, and the weighted coefficients are combined to provide a filtered output signal. The FIR and IIR filters have relative advantages and disadvantages but it is well known that FIR filters are inherently stable, and that IIR filters give rise to stability problems. The present invention is directed toward ameliorating instabilities in ghost cancelling systems which use IIR type ghost cancelling filters.

SUMMARY OF THE INVENTION

The present invention is a ghost cancelling system including a ghost cancelling IIR filter and channel modelling circuitry for generating tap weighting coefficients for programming the ghost cancelling IIR filter. The channel modelling circuitry includes means for calculating the sum of all of the generated weighting coefficient values. If the sum exceeds a predetermined value indicative of the IIR filter becoming unstable, the weighting coefficients are conditionally scaled in a manner to reduce the sum, thus tending to reduce the possibility of filter instability.

DETAILED DESCRIPTION

Apparatus for generating weighting coefficients for ghost cancelling systems are relatively well known by those persons skilled in the art of video signal processing, and thus such apparatus will not be described here in detail. Suffice it to say that typical weighting coefficient generating apparatus consist of special purpose programmable microprocessors, which may be programmed to perform a variety of algebraic functions. Therefore it is presumed that it will be a simple exercise for one skilled in the art of implementing weighting coefficient generating apparatus, to further program such apparatus to perform simple arithmetic manipulations on the weighting coefficients once generated.

Figure 1:
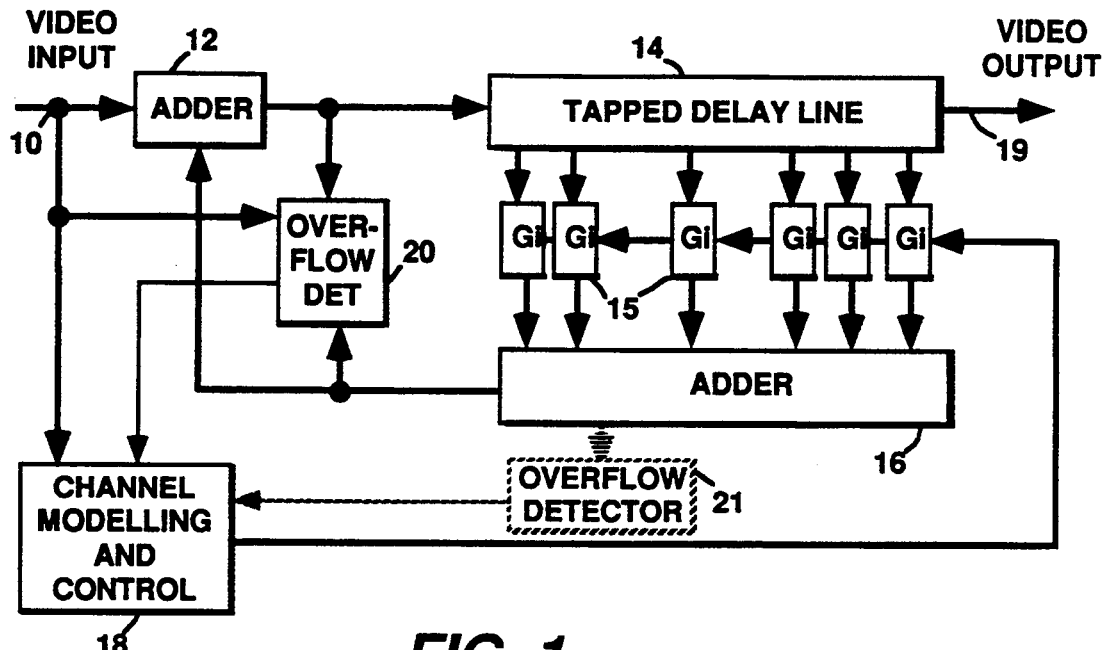
FIG. 1 is a block diagram of a ghost cancelling system incorporating the present invention.

Referring to FIG. 1, the elements 10-18 comprise the basic structure of known ghost cancelling systems which utilize IIR ghost cancelling filters. Input signal is applied to bus 10 from for example an antenna/tuner combination. The input signal is coupled to a channel modelling and control element 18, which is responsive to a ghost cancelling reference signal included at regular predetermined intervals in the input signal for generating weighting coefficients to be applied to the ghost cancelling filter. The ghost cancelling filter consists of the adder 12, the tapped delay line 14, the plurality of weighting circuits 15 and the adder 16. The input signal is applied to the adder 12 which has an output coupled to the input of the tapped delay line. Relatively delayed replicas of the signal input to the delay line are accessed at the respective taps and weighted by coefficient values generated by the channel modelling element 18. The weighted replicas are summed in the adder 16, and the resultant sum is applied to the second input connection of the adder 12. Assuming the weighting coefficients were accurately calculated, the signal from adder 16 applied to the second input of the adder 12 will include a compliment of signal components necessary to cancel any multipath distortion included in the input signal. It is to be noted that since the signal fed back from the adder 16 is arranged to cancel components in the input signal, the adder 12 may in fact be realized with a subtracter. Whether element 12 is realized as an adder or subtracter is dependent upon the relative polarities assigned to the respective weighting coefficients.

It has been found for IIR ghost cancelling filters, that if the magnitudes of all of the weighting coefficients applied to the ghost cancelling IIR filter sum to a value greater than one, the filter may be unstable. For filters with clocked delay elements stability may be predicted by factoring the filter transfer function and determining if any Z-plane poles have magnitudes greater than zero. The stability is also dependent in part on the variable dynamic range of the input signal and the fixed dynamic range of the processing apparatus. In a television system the dynamic range of received television signals differ from channel to channel, hence a IIR ghost cancelling filter may be unstable for one channel but not another.

Figure 3:
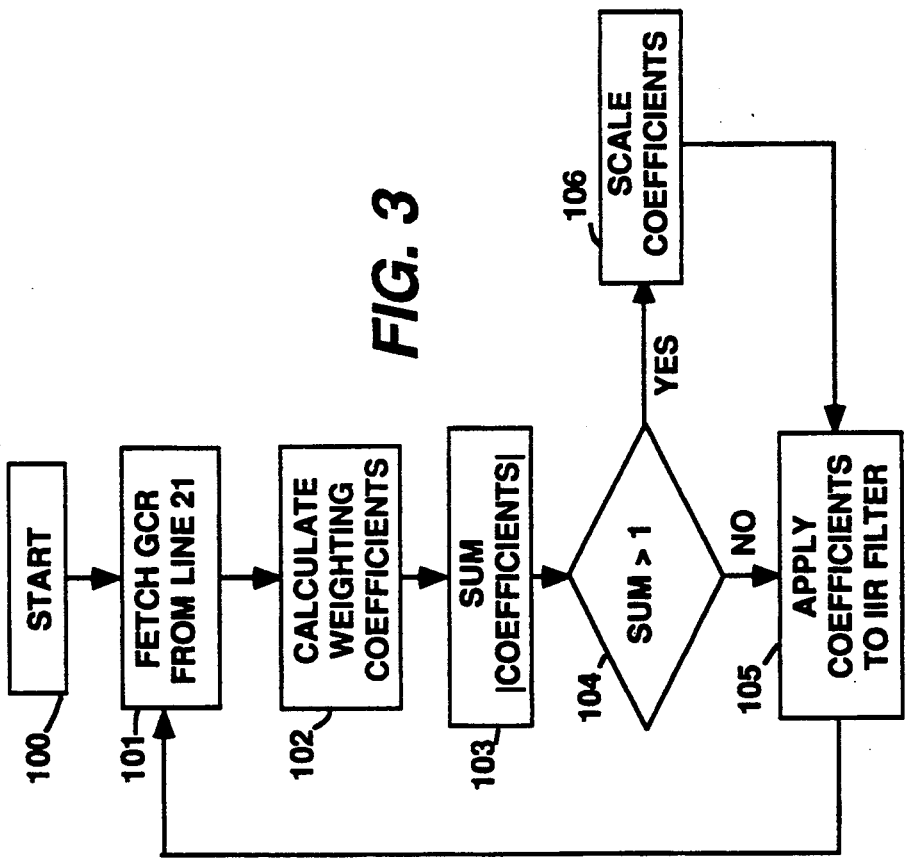

In a first embodiment of the invention the ghost cancelling IIR filter is made unconditionally stable. In this embodiment the channel modelling and control apparatus is arranged to operate according to the flow chart illustrated in FIG. 3. The channel modelling and control apparatus, responsive to horizontal and vertical synchronizing components of the input video signal obtains [101] the ghost cancelling reference (GCR) signal contained in line 21 of the video signal. Using the received GCR and a stored ideal version of the GCR, it calculates [102] the weighting coefficients for programming the ghost cancelling IIR filter to eliminate ghosts in the channel currently being received. The magnitudes of the weighting coefficients are summed [103] and the resultant sum is compared [104] to the value one. If the sum is less than one, the weighting coefficients are applied [105] to the respective weighting circuits in the IIR filter. If the sum is greater than one, the respective weighting coefficients are scaled to lessen the sum of coefficients. The scaling factor may be of the form $1/(\alpha S)$ where S is the sum of weighting coefficients and $\alpha$ is a factor one or less but close to one e.g., 0.95. The factor $\alpha$ may be made dependent upon the value of S, and selected such that $\alpha S$ is not less than a predetermined value e.g., 1.1. After the weighting coefficients have been scaled, they are applied [105] to the respective weighting circuits in the filter.

The weighting coefficients may be complex valued if the ghost cancelling filter is arranged to process quadrature components of the input signal. In this instance the magnitudes of the complex components may be summed to simplify the hardware requirements. Assume that the coefficients C, are of the form $$C_i = x_i + jy_i.$$

The sum of the coefficients is given by;

$$S = \sum_i^n |x_i| + |y_i|.$$

Using this value for the sum imposes a stricter bound, since it will always exceed the sum of the actual magnitudes $|x_i + jy_i|$.

Figure 4:
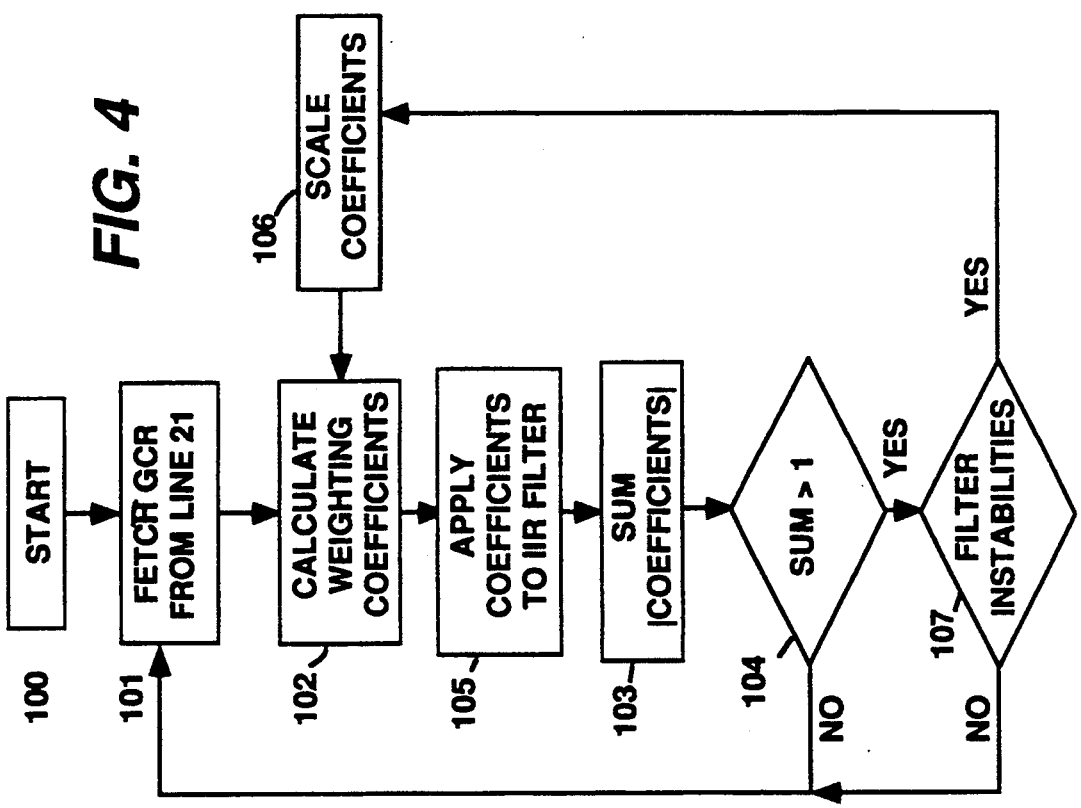
FIGS. 3 and 4 are representative flow charts of the operation of the FIG. 1 system.

As mentioned above, merely because the sum of the magnitudes of the weighting coefficients exceeds one, the filter is not necessarily unstable. If it is not unstable and the coefficients are scaled, ghost cancellation will be somewhat impaired. Therefore, when the sum of weighting coefficients exceed the value one, it is desirable to scale these coefficients only if the filter will exhibit unstable tendencies. The weighting coefficients are used to program the filter even if their sum exceeds the value one, and then the filter is tested for instability, and if an indication of instability is detected, the coefficients are scaled. Operation in this mode is represented by the flow chart of FIG. 4. It is to be noted that the operation indicated in FIG. 4 allows for the iterative incremental scaling of the coefficients until filter instabilities disappear.

One method for detecting unstable tendencies in the IIR filter is to monitor the adder 12 for output overflows or underflows. Overflows and underflows occur, in two's complement arrangements for example, if two like polarity sample values applied to the input connections of an adder, sum to a value which is greater than the output bits of the adder can represent. The FIG. 1 apparatus includes an over/underflow detector 20. The over/underflow detector generates an output signal indicative of over/underflows, which output signal is coupled to the channel modelling and control circuitry 18. The circuitry 18, responsive to the signal indicative of over/underflows, scales the generated weighting coefficients to lessen the sum of the magnitudes of the weighting coefficients. Note that the circuitry 18 may be arranged to automatically scale the weighting coefficients if their sum exceeds a predetermined value greater than one, and to conditionally scale the weighting coefficients in accordance with over/underflow detection if the sum of coefficients is greater than one but less than said predetermined value.

The adder 16 may also exhibit over/underflows of partial sums. However these over/underflows will not affect filter stability. Hence it is not necessary to monitor this adder for over/underflows to insure filter stability. However over/underflows exhibited within the adder 16 may affect the accuracy of ghost cancelling performance. Thus for superior system performance it is desirable to monitor the adder 16 for the occurrence of over/underflows, and responsive thereto scale the weighting coefficients. In this instance the scale factor may be different than the scale factor used when the adder 12 over/underflows.

Figure 2:
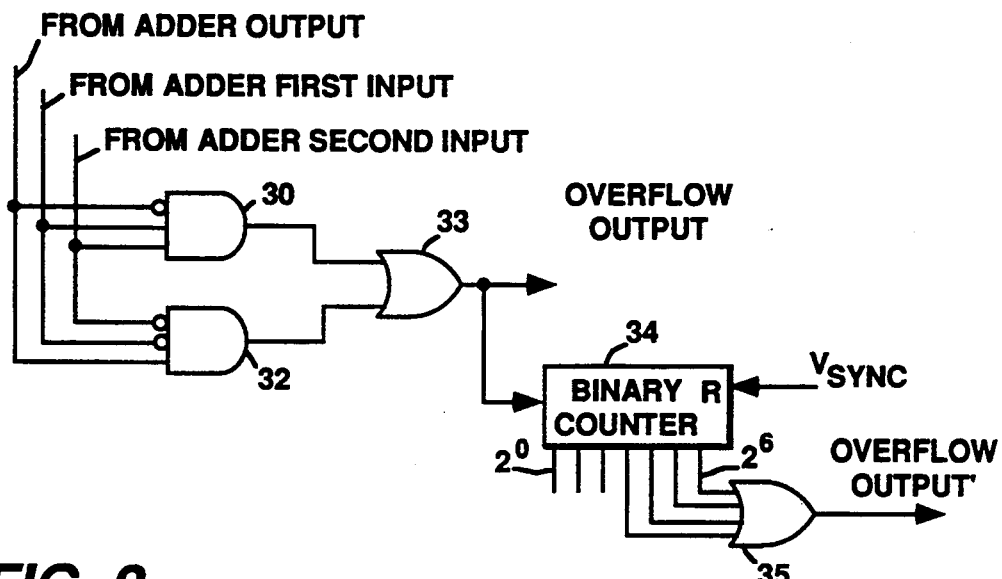
FIG. 2 is a logic diagram of two's complement overflow detector which may be implemented in the FIG. 1 apparatus.

FIG. 2 shows an exemplary over/underflow detector which may be implemented for two's complement number systems. This circuitry is responsive to the sign-bits of the samples applied to the input of the adder and the sign-bit of the result provided by the adder. An overflow occurs when two positive input values produce a negative output value and an underflow occurs when two negative input values produce a positive output value. The occurrence of these two conditions is detected with two AND gates (30, 32) and one OR gate 33. In two's complement number systems, positive numbers have logic zero sign-bits and negative numbers have logic one sign-bits. Detection of the overflow condition is performed by the AND gate 32 having the output sign-bit of the adder connected to its non-inverting input and the two input sign-bits of the adder connected to respective inverting inputs. Similarly detection of the underflow condition is performed by the second AND gate 30 having the output sign-bit of the adder connected to its inverting input and the two input sign-bits of the adder connected to respective non-inverting inputs. The AND gates 32 and 30 will exhibit logic high levels at their respective output connections only on the occurrence of an overflow and an underflow respectively. The output connections of the AND gates 30 and 32 are coupled to respective input connections of the OR gate 33, which provides a composite over/underflow detection signal at its output connection.

The over/underflow signal provided by the OR gate 33 may be directly coupled to the circuitry 18 to control coefficient scaling. However single occurrences of over/underflows may not accurately indicate filter instability. Therefore it is desirable to process the output of the OR gate 33 before application to the circuit 18. One example of over/underflow signal processing is shown in FIG. 2. In this example the output of the OR gate 33 is coupled to the count input of a binary counter 34. A vertical synchronizing signal is coupled to a reset control of the counter and resets the count value to zero at the beginning of each field interval. The counter 34 thus counts the number of occurrences of over/underflows each field period. The more significant output bits of the counter 34 are coupled to respective input connections of an OR gate 35, i.e., bits $2^3$–$2^6$. The Or gate 35 provides the over/underflow' output signal whenever there are 8 or more over/underflow indications provided by the OR gate 33 in a field interval. Another example of over/underflow signal processing may include providing an over/underflow" signal only after the occurrence of a predetermined number of over- /underflow indications for consecutive samples per field interval.

What is claimed is:

1. Multipath signal canceling apparatus comprising:
   a source of input signal;
   a programmable IIR filter including; delay elements for providing a plurality of relatively delayed signals, weighting circuits, having input connections for receiving weighting coefficients, said weighting circuits for weighting respective said delayed signals, combining circuitry coupled to said weighting circuits, for combining weighted signals provided by said weighting circuitry, and signal summing means for combining said input signal and output signal provided by said combining circuitry;
   channel modeling means, responsive to said input signal, for generating said weighting coefficients, said channel modeling means arranged to add the magnitudes of the generated weighting coefficients together to generate a sum of weighting coefficients and to scale said weighting coefficients to produce scaled weighting coefficients if said sum of weighting coefficients exceeds a predetermined value, said scaling of said weighting coefficients arranged to reduce said sum of weighting coefficients; and
   means for applying said scaled weighting coefficients to said input connections if said sum of weighting coefficients exceeds said predetermined value and for applying said weighting coefficients to said connections otherwise.

2. The apparatus set forth in claim 1 wherein said predetermined value is greater than one.

3. The apparatus set forth in claim 1 wherein said means for scaling said weighting coefficients includes means coupled to said IIR filter for detecting potential IIR filter instabilities, and performing scaling of the weighting coefficients if potential filter instabilities are detected.

4. Multipath signal canceling apparatus comprising:
   a source of digital input signal;
   a programmable IIR filter including; delay elements for providing a plurality of relatively delayed signals, weighting circuits, having input connections for receiving weighting coefficients, said weighting circuits for weighting respective said delayed signals, combining circuitry coupled to said weighting circuits, for combining weighted signals provided by said weighting circuits, and a digital adder having a limited dynamic range, for combining said digital input signal and output signal provided by said combining circuitry;
   channel modeling means, responsive to said digital input signal, for generating said weighting coefficients;
   a detector coupled to said IIR filter for detecting potential IIR filter instabilities including a signal overflow detector responsive to the polarities of input and output signals applied to and available from said digital adder: and
   wherein said channel modeling means includes means arranged to add the magnitudes of the generated weighting coefficients together to generate a sum of weighting coefficients and means to provide scaled said weighting coefficients if said sum of weighting coefficients exceeds a predetermined value and IIR filter instabilities are detected, and wherein a sum of said scaled weighting coefficients is less than said sum of weighting coefficients: and
   means for applying said scaled weighting coefficients to said input connections if IIR filter instabilities are detected and for applying said weighting coefficients to said input connections otherwise.

5. The apparatus set forth in claim 4 wherein said signal overflow detector includes means for processing signal indicating signal overflows such that scaling of weighting coefficients is initiated only on the occurrence of predetermined overflow conditions.

6. The apparatus set forth in claim 1 wherein said channel modeling means generates a scaling factor proportional to the reciprocal of the sum of the weighting coefficients.

7. Multipath signal canceling apparatus comprising:
   a source of input video signal;
   a programmable IIR filter including signal summing means, having respective input and output terminals, said summing means for combining said input video signal and a signal representing a combination of delayed and weighted versions of signal available at said output terminal of said summing means, said IIR filter having a plurality of weighting circuits with respective input connections for receiving weighting coefficients and output connections for providing said weighted versions;
   means coupled to said summing means for generating an overflow signal OVF indicating occurrences of the dynamic range of said signal summing means being exceeded;
   channel modeling means, responsive to said input video signal, for generating said weighting coefficients and responsive to said overflow signal OVF, for scaling said weighting coefficients when the dynamic range of the summing means is exceeded; and
   means for applying said scaled weighting coefficients to said input connections when said dynamic range is exceeded and applying said weighting coefficients to said input connections otherwise.

8. The apparatus set forth in claim 7 wherein said means for generating said overflow signal OVF includes means for processing said signal OVF such that scaling of weighting coefficients is initiated only after the dynamic range of the summing means is exceeded a predetermined number of times per predetermined interval.

9. The apparatus set forth in claim 7 wherein said channel modeling means generates a scaling factor proportional to the reciprocal of a sum of all of said weighting coefficients.

* * * * *